United States Patent
Sasaki et al.

(10) Patent No.: US 6,831,597 B2
(45) Date of Patent: Dec. 14, 2004

(54) VEHICLE THEFT PREVENTION DEVICE

(75) Inventors: Yoshihiro Sasaki, Kobe (JP); Minoru Yoshimura, Kobe (JP)

(73) Assignee: Fujitsu Ten Limited, Hyogo (JP)

(*) Notice: Subject to any disclaimer, the term of this patent is extended or adjusted under 35 U.S.C. 154(b) by 0 days.

(21) Appl. No.: 10/219,867

(22) Filed: Aug. 15, 2002

(65) Prior Publication Data

US 2003/0034915 A1 Feb. 20, 2003

(30) Foreign Application Priority Data

Aug. 16, 2001 (JP) .......................................... 2001-247254

(51) Int. Cl.$^7$ ............................. G01S 5/02; H04B 7/185
(52) U.S. Cl. ............................. 342/357.07; 342/357.09; 342/357.13
(58) Field of Search ....................... 342/357.01, 357.07, 342/357.09, 357.13; 701/213, 215

(56) References Cited

U.S. PATENT DOCUMENTS

| | | | | |
|---|---|---|---|---|
| 4,908,629 A | * | 3/1990 | Apsell et al. ................ | 342/457 |
| 5,003,317 A | * | 3/1991 | Gray et al. .................. | 342/457 |
| 5,223,844 A | * | 6/1993 | Mansell et al. ............. | 342/357 |
| 5,550,551 A | * | 8/1996 | Alesio ......................... | 342/457 |
| 5,939,975 A | * | 8/1999 | Tsuria et al. ................ | 340/426 |
| 6,067,007 A | * | 5/2000 | Gioia .......................... | 340/426 |
| 2002/0036566 A1 | * | 3/2002 | Isobe .......................... | 340/426 |
| 2002/0154036 A1 | * | 10/2002 | Flick ........................... | 340/988 |
| 2002/0163418 A1 | * | 11/2002 | Nemoto ....................... | 340/5.2 |

FOREIGN PATENT DOCUMENTS

| | | |
|---|---|---|
| JP | JU-A-6-47059 | 6/1994 |
| JP | 10-132917 | 5/1998 |
| JP | A-10-132917 | 5/1998 |
| JP | A-10-226315 | 8/1998 |
| JP | A-11-108675 | 4/1999 |
| JP | A-11-268615 | 10/1999 |
| JP | A-11-303480 | 11/1999 |
| JP | A-2000-272475 | 10/2000 |
| JP | A-2001-14575 | 1/2001 |
| JP | A-2001/018754 | 1/2001 |
| JP | JU-B-3075893 | 3/2001 |

* cited by examiner

*Primary Examiner*—Dao Phan
(74) *Attorney, Agent, or Firm*—Christie, Parker and Hale, LLP

(57) ABSTRACT

There is provided a vehicle theft prevention device including a navigation device to detect the position of a vehicle on the earth, a security device to detect that the vehicle has been stolen, and an automobile telephone to transmit the position of the vehicle to a monitoring center after the detection of the theft of the vehicle. When the security device does not detect the theft of the vehicle, a position of the vehicle periodically detected by the navigation device is stored in a memory of the security device. When the theft of the vehicle is detected by the security device, the latest information of the vehicle stored in this memory is transmitted to the monitoring center by the automobile telephone, and the monitoring center can immediately determine the theft and the position of the stolen vehicle.

19 Claims, 8 Drawing Sheets

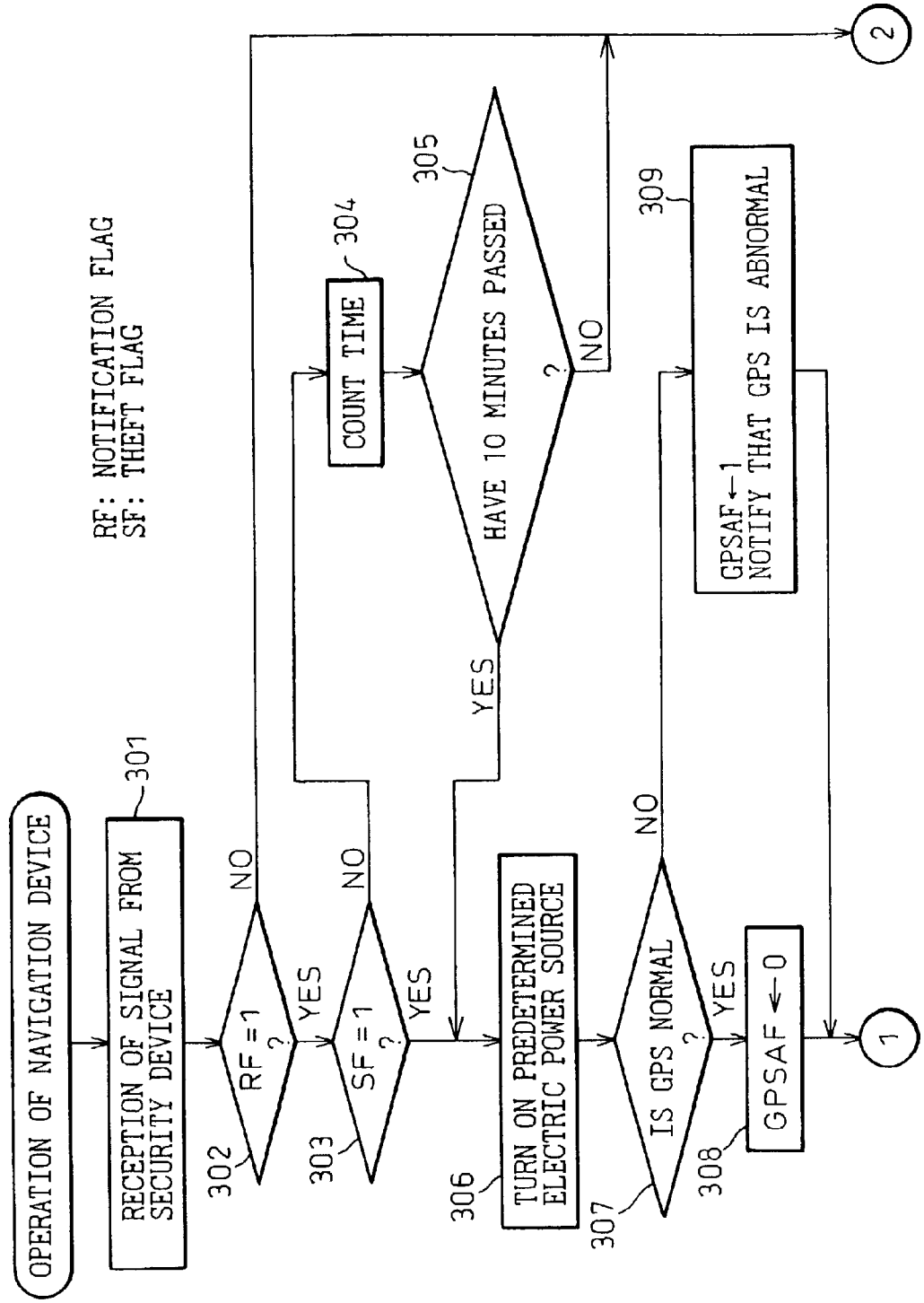

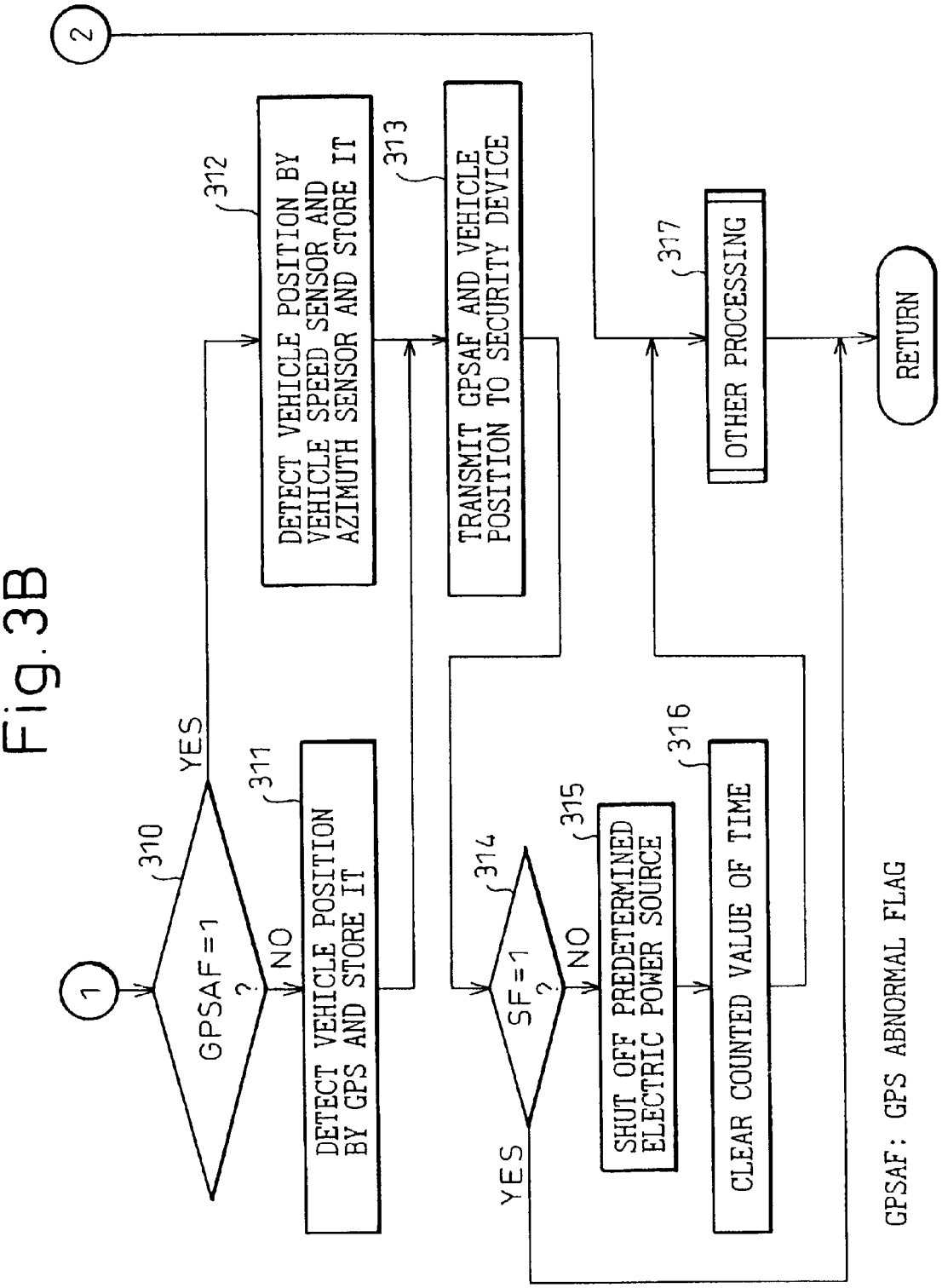

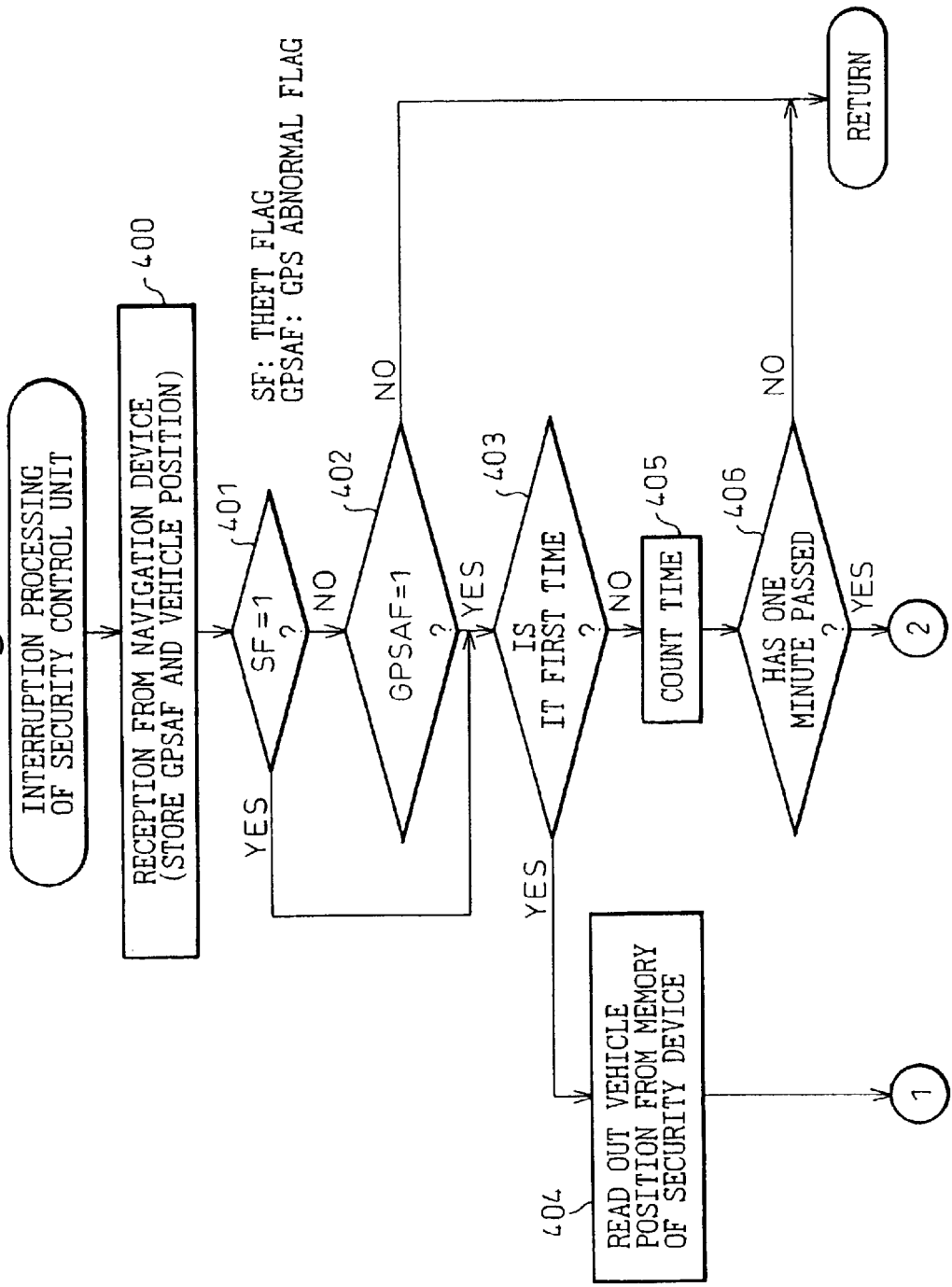

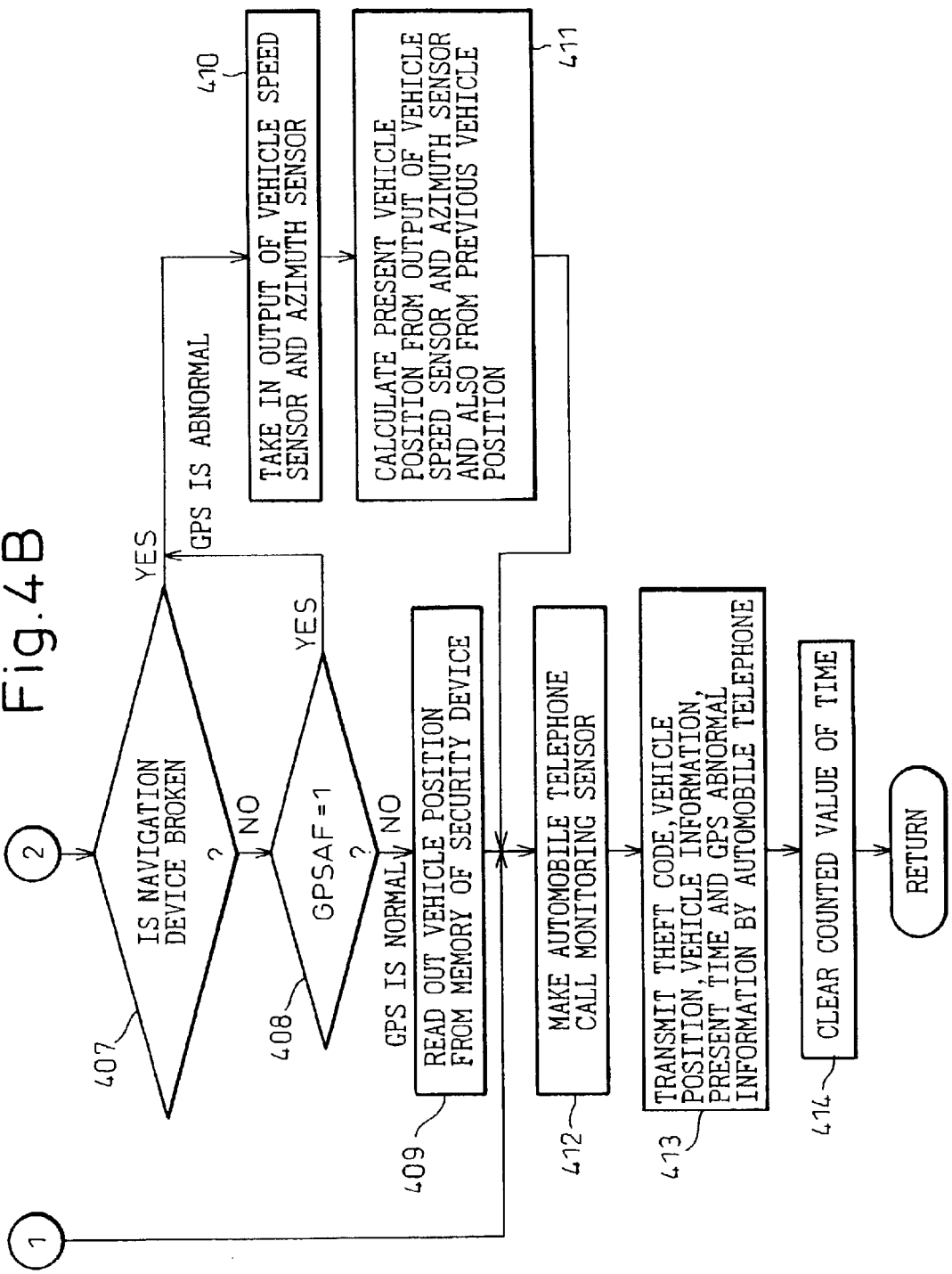

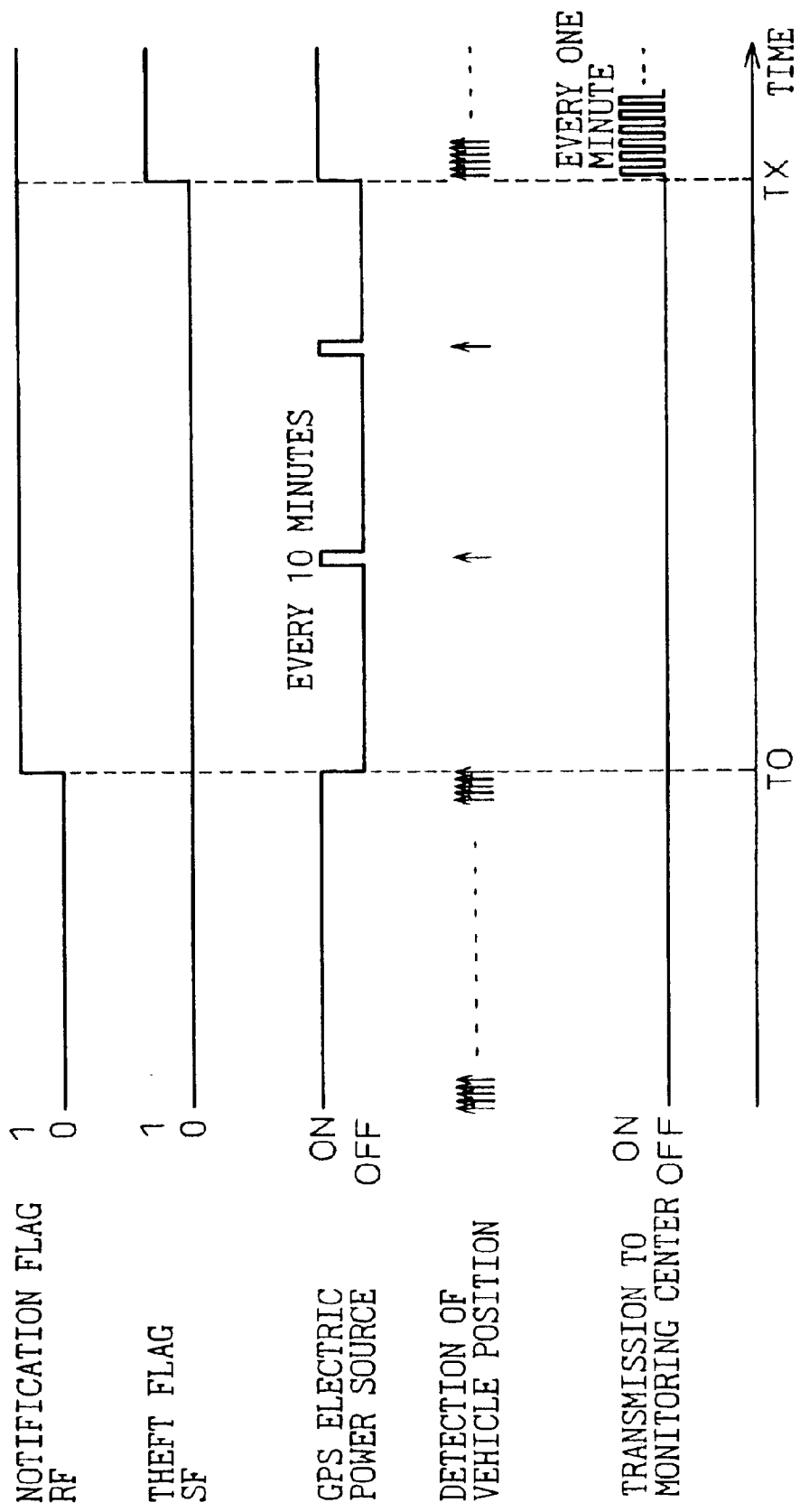

VEHICLE THEFT PREVENTION DEVICE

CROSS-REFERENCE TO RELATED APPLICATION

This application claims priority of Japanese Patent Application No. 2001-247254, filed on Aug. 16, 2001.

BACKGROUND OF THE INVENTION

1. Field of the Invention

The present invention relates to a vehicle theft prevention device. More particularly, the present invention relates to a vehicle theft prevention device mounted on a vehicle such as an automobile to prevent theft of the vehicle when it is stopped.

2. Description of the Related Art

Conventionally, since a moving body such as an automobile capable of moving by itself can be easily conveyed to a remote place by a thief, it is difficult for an owner of the automobile to find the stolen automobile. Especially, a four-wheel drive car or deluxe car is conveyed abroad, in some cases, after it is stolen. Accordingly, it is important to get back a stolen automobile before it is conveyed to a remote place by notifying the police of the theft at the time of occurrence of the theft.

According to the recent development of technology for moving body communication, the size of an automobile telephone has been reduced and further the price has been decreased. Therefore, it is easy to incorporate the telephone into an automobile. Accordingly, various vehicle theft prevention devices have been recently proposed, in which the automobile telephone is combined with a navigation device utilizing GPS (Global Positioning System), and after a vehicle has been stolen, a position of the stolen vehicle is detected by the navigation device and the thus detected vehicle position is transmitted to a base station by the automobile telephone.

For example, Japanese Unexamined Patent Publication No. 10-132917 discloses a vehicle position detecting system, the constitution of which is described as follows. An automobile telephone is connected with a vehicle position detecting system composing a navigation system. When an owner of the vehicle finds out that the vehicle has been stolen, the owner calls this automobile telephone from a nearby telephone. Then, the navigation device detects a present position of the vehicle by a signal of the automobile telephone which has been called from the outside, and the thus detected present position of the vehicle is transmitted to the owner via the automobile telephone. Therefore, the owner of the vehicle can confirm the present position of the stolen vehicle.

However, the aforementioned vehicle position detecting system has the following disadvantages. It is impossible for the owner to confirm the present position of the vehicle until the owner recognizes that his vehicle has been stolen. Accordingly, there is a risk that the stolen vehicle is conveyed abroad in the meantime where it is impossible for the electric waves of the automobile telephone system to reach the automobile. Further, there is a possibility that the receiver or antenna of the stolen vehicle is removed or broken by a thief after the vehicle has been stolen. Therefore, it is impossible for the navigation device, which is provided in the vehicle, to detect its position even if the owner of the vehicle calls the automobile telephone of the vehicle. In the case where the navigation device is out of order, it is impossible to detect the present position of the vehicle. Therefore, it is impossible for the owner of the vehicle to confirm the present position of the vehicle.

SUMMARY OF THE INVENTION

It is a first object of the present invention to provide a theft prevention device characterized in that a base station can immediately recognize that a vehicle has been stolen when the occurrence of theft and the present position of the vehicle are transmitted to the base station immediately after the theft of the vehicle has been detected. It is a second object of the present invention to provide a theft prevention device characterized in that even when a navigation device of a vehicle is out of order, the theft prevention device can immediately detect the failure of the navigation device and the can determine position where the navigation device became out of order.

The characteristics of the present invention to accomplish the above objects are shown in the first to the eleventh aspect described below.

In the first aspect, there is provided a theft prevention device comprising: a position detecting means for detecting a position of a moving body on the earth; a theft detecting means for detecting theft of the vehicle; and a transmitting means, wherein after the theft detecting means detects theft of the vehicle, a position of the vehicle is detected by the position detecting means and transmitted to a predetermined position by the transmitting means, the theft prevention device further comprising a position storing means for periodically storing a position of the vehicle detected by the position detecting means, wherein when the theft detecting means detects theft of the vehicle, the transmitting means transmits the latest positional information stored in the position storing means.

In the second aspect, there is provided a theft prevention device according to the first aspect, further comprising an abnormal state detecting means for detecting an abnormal state of the position detecting means, wherein when the abnormal state detecting means detects an abnormal state of the position detecting means, the transmitting means transmits the latest positional information stored in the position storing means.

In the third aspect, there is provided a theft prevention device comprising: a position detecting means for detecting a position of a moving body on the earth; a theft detecting means for detecting theft of the vehicle; and a transmitting means, wherein, after the theft detecting means detects theft of the vehicle, a position of the vehicle is detected by the position detecting means and transmitted to a predetermined position by the transmitting means, the theft prevention device further comprising: a position storing means for periodically storing the position of the vehicle detected by the position detecting means; and an abnormal state detecting means for detecting an abnormal state of the position detecting means, wherein when the abnormal state detecting means detects an abnormal state of the position detecting means, the transmitting means transmits the latest positional information stored in the position storing means.

In the fourth aspect, there is provided a theft prevention device according to one of the first to the third aspects, wherein at least the position storing means is accommodated in a casing which is separate from a casing in which the position detecting means is accommodated.

In the fifth aspect, there is provided a theft prevention device according to one of the first to the fourth aspects, wherein the position detecting means turns on an electric power source of a circuit necessary for periodically detecting a position of a vehicle and detects the position of the vehicle even in an alert state of the vehicle after the vehicle has stopped or in a state in which the position detecting means does not operate.

In the sixth aspect, there is provided a theft prevention device according to the fifth aspect, wherein the transmitting means periodically transmits the latest positional information stored in the position storing means even after the completion of the first transmission.

In the seventh aspect, there is provided a theft prevention device according to one of the first to the fifth aspect, the position detecting means including: a first position detecting means in which GPS is utilized; and a second position detecting means for detecting a position of the vehicle by using a movement parameter of the vehicle and also using an azimuth parameter based on terrestrial magnetism wherein, when the first positional detecting means is out of order, the second positional detecting means detects a position of the vehicle on the basis of the latest positional information stored in the positional storing means, and the transmitting means periodically transmits the position of the vehicle.

In the eighth aspect, there is provided a theft prevention device, according to the sixth or the seventh aspect, wherein a periodical transmitting period of transmitting a position of the vehicle by the transmitting means is different from a position detecting period of detecting the position of the vehicle by the position detecting means.

In the ninth aspect, there is provided a theft prevention device according to one of the first to the eighth aspect, wherein the transmitting means transmits a signal to a monitoring center which monitors the vehicle theft and the abnormal state of the position detecting means at all times when the vehicle theft or the abnormal state of the position detecting device is detected.

In the tenth aspect, there is provided a theft prevention device according to the fifth aspect, wherein the theft detection means judges that the vehicle has been stolen when a position of the vehicle is greatly different from the previously detected position of the vehicle in the case of periodically detecting a position of the vehicle by the position detecting means.

In the eleventh aspect, there is provided a theft prevention device according to fifth aspect, wherein the theft detection means judges that the vehicle has been stolen when the position detecting means does not operate in the case of periodically detecting a position of the vehicle by the position detecting means.

According to the present invention, when it is detected that a vehicle has been stolen, the occurrence of vehicle theft and the present position of the stolen vehicle are immediately transmitted to a predetermined base station. Therefore, the base station can immediately grasp the occurrence of vehicle theft. Even in the case where a navigation device of the vehicle is out of order, the base station can immediately grasp the abnormal state and a position where the abnormal state occurred in the vehicle.

BRIEF DESCRIPTION OF THE DRAWINGS

The present invention will be more clearly understood from the description as set forth below with reference to the accompanying drawings, wherein:

FIGS. 3A and 3B are flow charts showing an example of operation of the navigation device shown in FIG. 1;

FIGS. 4A and 4B are flow charts showing an example of interruption processing conducted in the security control device shown in FIG. 1;

FIG. 5 is a wave form diagram showing operation of a theft prevention device of the present invention, wherein this wave form diagram shows a notification flag, theft flag, GPS electric power source, detection time of detecting a vehicle position, and timing of transmission to a monitoring center.

DESCRIPTION OF THE PREFERRED EMBODIMENTS

Referring to the accompanying drawings, a specific embodiment of the present invention will be explained in detail as follows.

Figure 1:
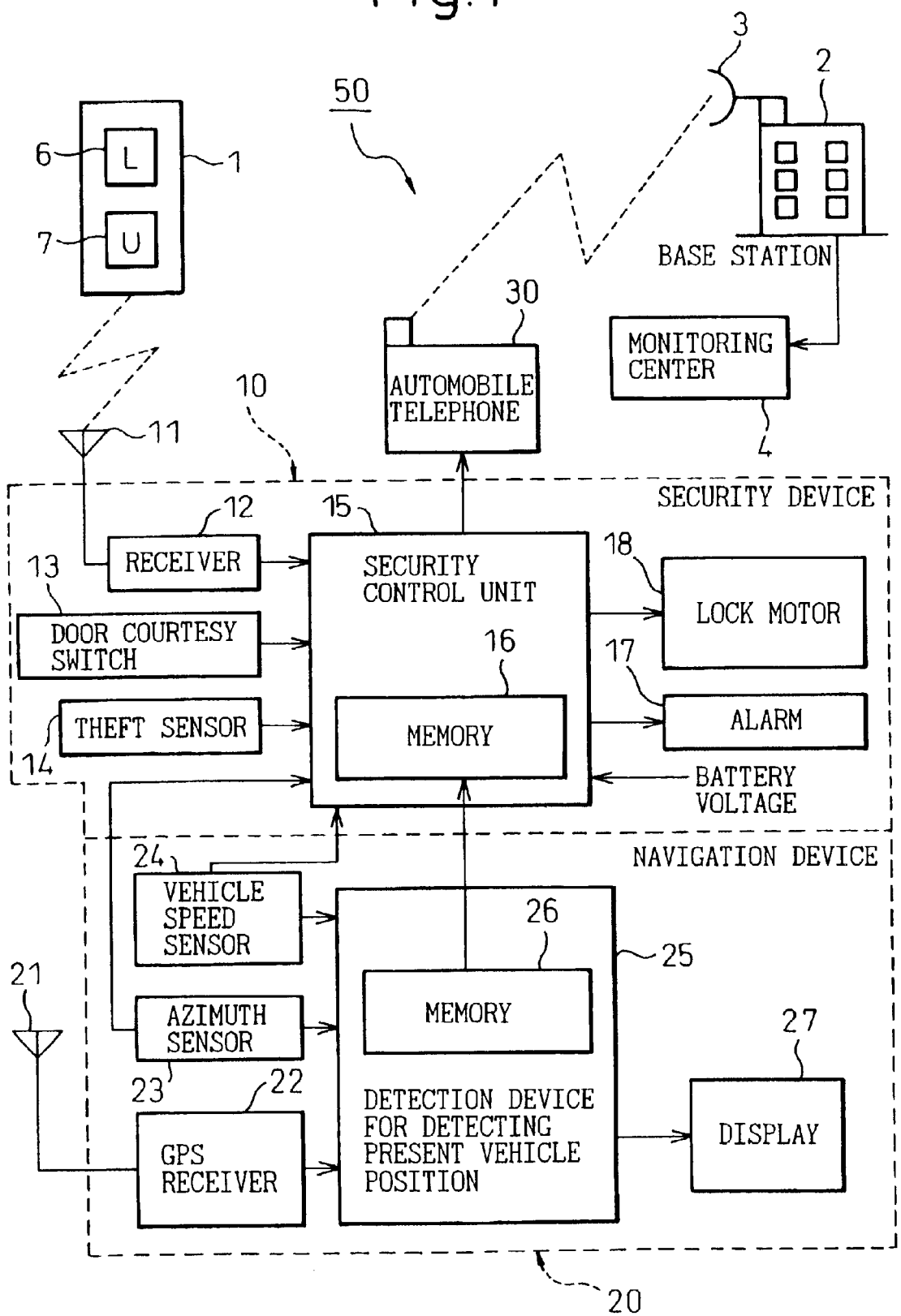
FIG. 1 is an arrangement view showing an overall arrangement of a theft prevention device of the present invention.

FIG. 1 is an arrangement view showing an overall arrangement of the theft prevention device 1 of an embodiment of the present invention. In this connection, a vehicle is omitted in the drawing of the embodiment. The theft prevention device 50 of this embodiment is mounted on a vehicle equipped with a wireless door lock remote control system in which a door can be opened and closed from the outside of the vehicle by the transmitter 1 operated by wireless. The transmitter 1 is provided with a lock button 6 to lock the door and an unlock button 7 to release the lock of the door. When the lock button 6 or unlock button 7 is pressed, a weak electric wave containing an identification code is transmitted from the transmitter 1.

The theft prevention device 50 mounted on a vehicle includes: a security device 10 connected with the automobile telephone 30; and a navigation device 20 connected with this security device 10. The automobile telephone 30 communicates with the antenna 3 arranged in the base station 2. Usually, the automobile telephone 30 is attached at a position in a vehicle which can not be seen from the passenger compartment in the vehicle, so that the automobile telephone 30 can not be easily found by other people and detached from the vehicle. For example, pieces of information sent from this automobile telephone 30 are: information to notify whether the security device is in a normal state or not; information to notify that the vehicle has been stolen; information to notify whether the navigation device 20 is in a normal state or not; and positional information to notify a vehicle position detected by the navigation device 20 when the vehicle was stolen. Information transmitted from the automobile telephone 30 is sent from the base station 2 to the monitoring center 4 and monitored by the monitoring center 4.

The security device 10 includes: an antenna 11, receiver 12, door courtesy switch 13, theft sensor 14, control unit 15 provided with a memory 16, alarm 17 and lock motor 18. The antenna 11 receives a weak electric wave sent from the transmitter 1, and the thus received electric wave is introduced into the receiver 12. The receiver 12 sends an identification code contained in the received electric wave to the security control unit 15. The door courtesy switch 13 detects an opening and closing motion of the vehicle door, and an opening and closing state of the door is sent to the security control unit 15. The theft detection sensor 14 detects a state of theft of the vehicle by damage to a window, vibration of the vehicle body, starting of the vehicle engine without using an engine key and damage to the security device, and the thus detected state of vehicle theft is sent to the security control unit 15. The alarm 17 is turned on when the theft sensor 14 detects that the vehicle has been stolen. The lock motor 18 locks and unlocks the door of the vehicle. When the security control unit 15 detects that the door lock button 6 of the transmitter 1 has been pressed, the lock motor 18 locks the door. When the security control unit 15 detects that the door unlock button 7 of the transmitter 1 has been pressed, the lock motor 18 releases the lock of the door.

Even when the vehicle is stopped and the engine key is taken off from the vehicle and the electric power source of the navigation device is turned off and the door is locked by the transmitter 1, this security device 10 is backed up by the battery voltage. Consequently, no information disappears from the memory 16 in any condition.

The navigation device 20 includes: GPS antenna 21, GPS receiver 22, azimuth sensor 23, vehicle speed sensor 24, present vehicle position detecting device 25 having the memory 26, and display 27. The GPS antenna 21 receives an electric wave from GPS satellite and introduces the thus received electric wave to GPS receiver 22, and the GPS receiver 22 demodulates the received electric wave and sends it to the present vehicle position detecting device 25. The azimuth sensor 23 detects an azimuth and sends it to the security control unit 15 of the security device 10 and the present vehicle position detecting device 25. In the same manner, the vehicle speed sensor 24 sends the detected vehicle speed to the security control unit 15 of the security device 10 and the present vehicle position detecting device 25. Other than the azimuth sensor 23 and the vehicle speed sensor 24, a terrestrial magnetism sensor may be used in some cases. The display 27 displays navigation information of the navigation device 20 so that a driver can recognize the navigation information.

Operation of each portion of the theft prevention device 50 composed as described above will be explained referring to a flow chart.

Figure 2:
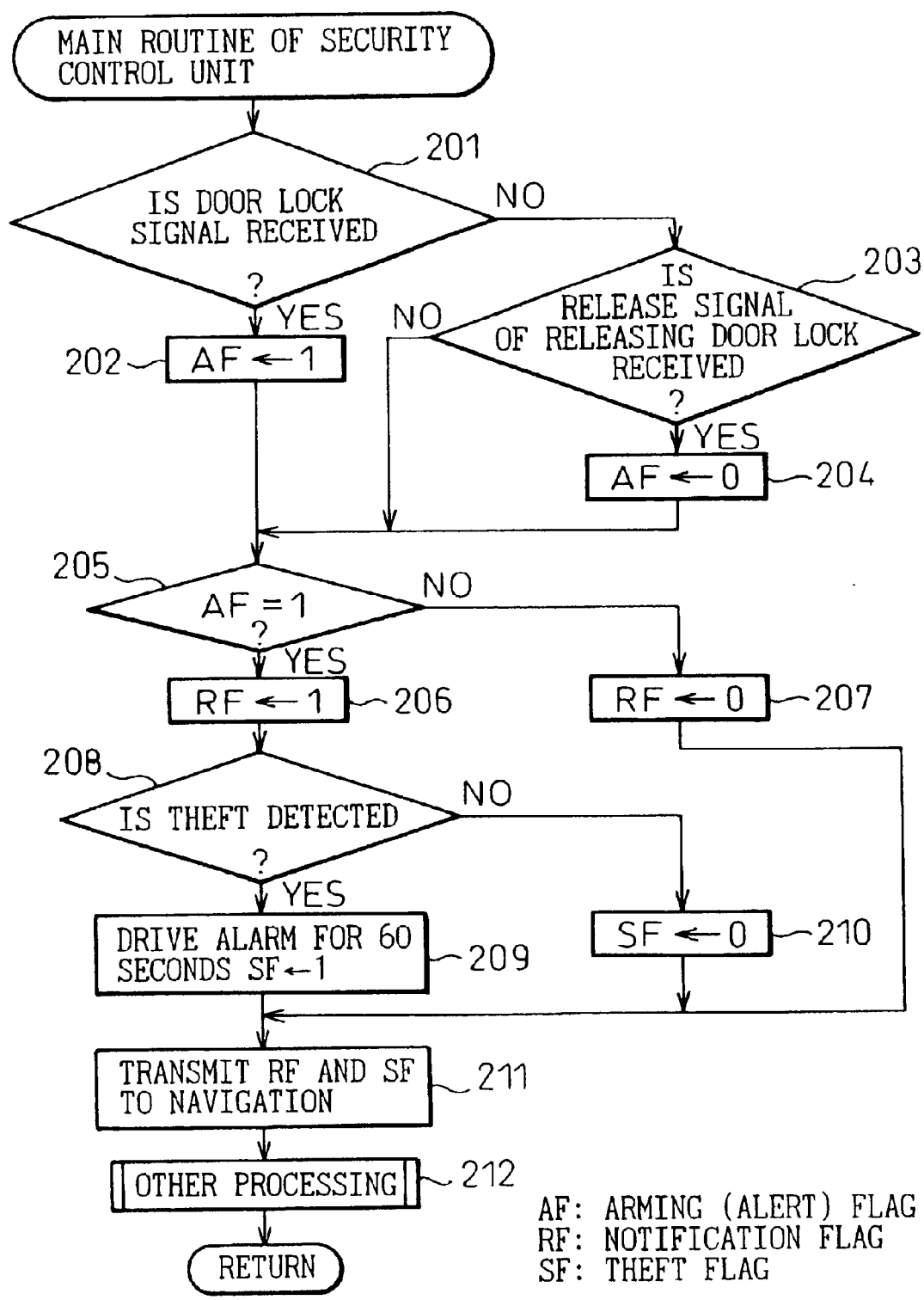
FIG. 2 is a flow chart showing an example of operation of the security control device shown in FIG. 1.

FIG. 2 is a flow chart of a main routine showing an example of operation of the security control unit 15 shown in FIG. 1. This flow is executed every predetermined period of time. In step 201, it is judged whether or not a door lock signal is received from the transmitter 1. When the door lock signal is received, the value of arming (alerting) flag AF is made to be "1" in step 202, and the program proceeds to step 205. This state is referred to as an alerting state (arming mode) of the vehicle. On the other hand, when a lock signal of the door is not received, it is judged in step 203 whether or not a door lock release signal (unlock signal) is received. When the door lock release signal is not received, the program proceeds to step 205 as it is. When the door lock release signal is received, the value of arming flag AF is made to be "0", and then the program proceeds to step 205.

In step 205, the present value of arming flag AF is judged. When the value of arming flag AF is "0", the value of notification flag RF is made to be "0" in step 207, and then the program proceeds to step 211. On the other hand, when the value of arming flag AF is "1", the value of notification flag RF is made to be "1" in step 206, and then the program proceeds to step 208, and it is judged whether or not the theft is detected. Judgment of the theft is made by a signal sent from the theft sensor 14. When the theft is not detected, the value of theft flag SF is made to be "0" in step 210, and the program proceeds to step 211. On the other hand, when the theft is detected in step 208, the alarm 17 is driven for 60 seconds in step 209. At the same time, the value of the theft flag SF is made to be "1", and the program proceeds to step 211.

In step 211, the values of notification flag RF and theft flag SF are sent to the navigation device 20. In the successive step 212, other processing is carried out, and this routine is completed. The above operation is repeated after a predetermined period of time has passed.

FIGS. 3A and 3B are flow charts showing an main routine of an example of operation of the navigation device 20 shown in FIG. 1. The operation shown in this flow chart is executed every predetermined period of time. In step 301, a signal sent from the security device 10 is received and processed. In the successive step 302, it is judged whether or not the value of notification flag RF is "1". When the value of notification flag RF is "0", the other processing is conducted in step 317, and then this routine is completed. When the value of notification flag RF is "1", the program proceeds to step 303, and it is judged whether or not the value of the theft flag SF is "1". In step 303, the time is counted. In the next step 305, it is judged whether or not the counted time has reached 10 minutes. When the counted time is shorter 10 minutes, the program process to step 317. However, when the counted time exceeds 10 minutes, the program process to step 306.

In step 306, predetermined electric power sources such as an electric power source of the navigation device 20 are turned on. In the next step 307, it is judged whether or not the present vehicle position detecting device (referred to as GPS in the drawing) such as GPS receiver 22 of the navigation device 20 is in a normal state. When GPS is in a normal state, the value of GPS abnormal flag GPSAF is made to be "0" in step 308, and then the program proceeds to step 310. On the other hand, when GPS is in an abnormal state, the program proceeds to step 309. In step 309, the value of GPS abnormal flag GPSAF is made to be "1", which shows that GPS is in an abnormal state, in step 309, and then the program proceeds to step 310.

In step 310, it is judged whether or not the value of GPS abnormal flag GPSAF is "1" which shows an abnormal state. When the navigation device 20 is in a normal state in which the value of GPS abnormal flag GPSAF is "0", the program proceeds to step 311, and a position of the vehicle (the present vehicle position) is detected by GPS and stored in the memory 26. When the navigation device 20 is in an abnormal state in which the value of GPS abnormal flag GPSAF is "1", the program proceeds to step 312, and a position of the vehicle is detected by the vehicle speed sensor 24 and the azimuth sensor 23 and stored in the memory 26.

After step 311 or 312 is completed, GPS abnormal flag GPSAF and the vehicle position are sent to the security device 10 in step 313. In the next step 314, it is judged whether or not the value of theft flag SF is "1". When the value of theft flag SF is "1", the routine is completed as it is. When the value of theft flag SF is "0", the predetermined electric power sources, which were turned on in step 306, are shut off in step 315. In step 316, the counted value of time, which was counted in step 304, is cleared. In step 317, other processing is carried out, and this routine is completed.

FIGS. 4A and 4B are flow charts showing an example of interruption processing conducted by the security control unit shown in FIG. 1. In the case of vehicle theft in which the value of theft flag SF becomes "1" or in the case where the navigation device 20 is in an abnormal state in which the value of GPS abnormal flag GPSAF becomes "1", this interruption processing is started and executed every short period of time, for example, every 50 ms.

In step 400, a signal is received from the navigation device 10, and the value of GPS abnormal flag GPSAF and the vehicle position are stored. In the successive step 401, it is judged whether or not the value of theft flag SF is "1". When the value of theft flag SF is "1", the program proceeds to step 403. On the other hand, when the value of theft flag SF is "0", it is judged in step 402 whether or not the value of GPS abnormal flag GPSAF is "1". When the value of theft flag SF is "1", the program proceeds to step 403. In step 403, the value of theft flag SF becomes "1" or the value of GPS abnormal flag GPSAF becomes "1", so that it is judged whether or not the program has proceeded to step 403 for the first time.

In the case where the program proceeds to step 403 for the first time, the program further proceeds to step 404, and the vehicle position is read out from the memory 16 of the security device 20. Next, in step 412, the automobile telephone is made to call the monitoring center 4. Then, in step 413, the theft code, vehicle position, information of the stolen vehicle and present time are transmitted by the automobile telephone 30. Alternatively, information that the GPS is out of order is transmitted by the automobile telephone 30. Due to the above processing, the monitoring center 4 can immediately know information of the stolen vehicle and a position where the vehicle is stolen at the time of the occurrence of theft. Alternatively, the monitoring center 4 can immediately know that GPS is out of order. After that, the counted value of time described later is cleared in step 414, and this routine is completed.

When the program proceeds to step 403 next time, it is not the first time. Therefore, the program proceeds to step 405, and the time is counted from the occurrence of vehicle theft or from the occurrence of an abnormal state of GPS device. In step 406, it is judged whether or not the counted time has reached one minute. When the counted time is shorter than one minute, nothing is executed and this routine is completed. On the other hand, when it is judged in step 406 that the counted time exceeds one minute from the point of time at which the counted time was cleared in step 414, it is judged in step 407 whether or not the navigation device 20 was broken. This judgment is made in the following manner. For example, the navigation device 20 is judged to be broken when GPS abnormal flag GPSAF and automobile information, which are periodically sent from the navigation device 20, are not sent for a period of time not less than the transmitting period. In the case where the navigation device 20 is broken, it is assumed that GPS antenna 21 and GPS receiver 22 are broken in this case, and also it is assumed that the azimuth sensor 23 and the vehicle speed sensor 24, which are arranged at positions difficult to be seen, are not broken. In the case where the navigation device 20 is not broken, it is judged in the next step 408 whether or not the value of GPS abnormal flag GPSAF is "1".

In the case where the navigation device 20 is not broken and the value of GPS abnormal flag GPSAF is "0", the vehicle position is read out from the memory 16 of the security device 10 in step 409, and the program proceeds to step 412. In step 412, the automobile telephone 30 is made to call the monitoring center 4 as described above. In step 413, the automobile telephone 30 transmits the theft code, vehicle position, information of the stolen vehicle, present time and information that the GPS (navigation device) is out of order, to the monitoring center 4. Due to the above processing, the monitoring center 4 can immediately realize the information of the stolen vehicle, position where the vehicle was stolen and abnormal state of GPS every one minute after the occurrence of the theft of the vehicle. After that, the counted value of time is cleared in step 414, and this routine is completed.

On the other hand, when it is judged in step 407 that the navigation device 20 was broken or when it is judged in step 408 that the value of GPS abnormal flag GPSAF is "1", the program proceeds to step 410. In step 410, instead of measuring the vehicle position by GPS, the output of the vehicle speed sensor 24 and that of the azimuth sensor 23 are taken in. In step 411, the present vehicle position is calculated from the output of the vehicle speed sensor 24 and that of the azimuth sensor 23 and also from the previous vehicle position. In this case, immediately after the navigation device has been broken or immediately after the navigation device 20 has become abnormal, it is possible to use a value stored in the memory immediately before the navigation device is broken or immediately before the navigation device 20 becomes out of order.

After step 411 has been completed, the program proceeds to step 412. In step 412, the automobile telephone 30 is made to call the monitoring center 4 as described above. In step 413, the automobile telephone 30 transmits the theft code, vehicle position, information of the stolen vehicle, present time and information that GPS (navigation device) is out of order, to the monitoring center 4. Due to the above processing, the monitoring center 4 can immediately realize the information of the stolen vehicle, position where the vehicle was stolen and abnormal state of GPS every one minute after the occurrence of the theft of the vehicle or the occurrence of an abnormal state of GPS. After that, the counted value of time is cleared in step 414, and this routine is completed.

FIG. 5 is a wave form diagram showing operation of the theft prevention device 50 of the embodiment explained above, wherein this wave form diagram shows a notification flag RF, theft flag SF, GPS electric power source, detection time of detecting a vehicle position, and timing of transmission to the monitoring center 4 together with the time. Before time T0, the vehicle is running, and the electric power source of GPS is turned on and the vehicle position is continuously detected every predetermined time. At time T0, the vehicle is stopped and the driver and other passengers get out of the vehicle, and the doors of the vehicle are locked. Accordingly, after that, the value of notification flag REF becomes "1", and the electric power source of GPS is turned on every 10 minutes, so that the vehicle position is detected and stored in the memory 16 of the security device 10 and the memory 26 of the navigation device 20.

Consideration is given to a case in which the vehicle is stolen at time TX after that. When it is detected that the vehicle has been stolen, the value of theft flag SF becomes "1", and the electric power source of GPS is turned on. Then, detection of the vehicle position is started, and the automobile telephone 30 transmits the positional data of the vehicle, which has been stolen, to the monitoring center 4 every one minute after the occurrence of the theft.

In the embodiment explained above, it is possible for the monitoring center 4 to grasp a position of the vehicle immediately after the occurrence of the theft of the vehicle or immediately after the occurrence of an abnormal state of the navigation device. Accordingly, when this information is notified to the police after the owner of the vehicle has confirmed the theft, it is possible to trace the stolen vehicle.

Figure 6:
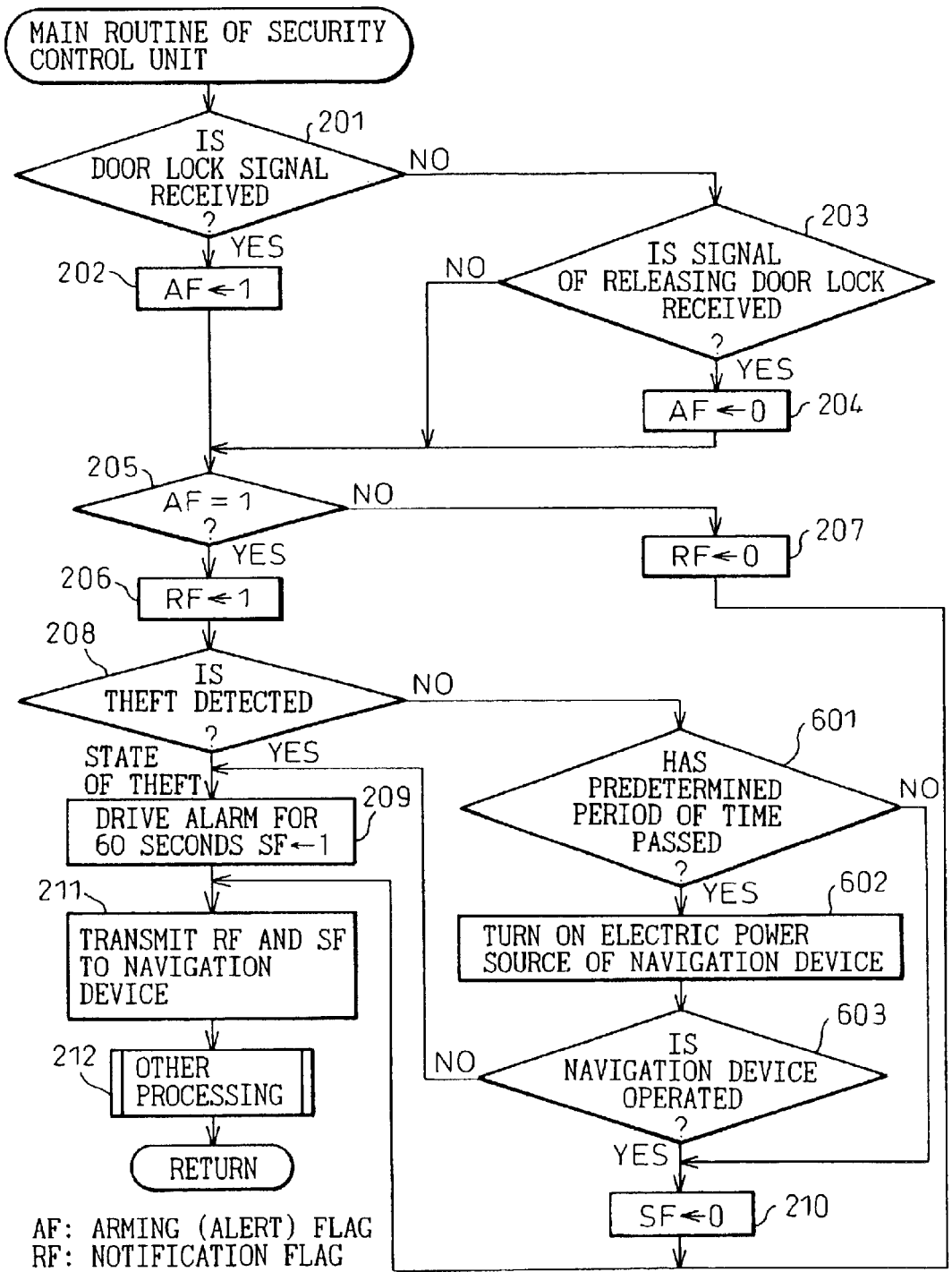
FIG. 6 is a flow chart showing another embodiment of operation of the security control device shown in FIG. 1.

FIG. 6 is a flow chart showing another embodiment of a main routine of operation of the security control device 10 shown in FIG. 1. The difference between this embodiment and the embodiment of the main routine of the operation of the security device 10 explained in FIG. 2 is only that steps 601 to 603 are added between step 208 and step 210 in the flow chart shown in FIG. 2. Accordingly, like step numbers are used to indicate like steps in FIGS. 2 and 6, and only the added steps are explained here.

In the embodiment explained in FIG. 2, when the theft is not detected in step 208, the value of theft flag SF is made to be "0" in step 210, and then the program proceeds to step 211. On the other hand, in the embodiment explained in FIG. 6, when the theft is not detected in step 208, the program proceeds to step 601, and it is judged whether or not a predetermined time has passed. In the case where a predetermined time has not passed, the program proceeds to step 210 in the same manner as that of the embodiment explained in FIG. 2, and the value of the theft flag SF is made to be "0", and the program proceeds to step 211. On the other hand, when the theft is not detected in step 208 and it is judged in step 601 that the predetermined time has passed, the program proceeds to step 602, and the electric power source of the navigation device (abbreviation is described as "navi" in FIG. 6) 20 is turned on. In the next step 603, it is judged whether or not the navigation device 20 is normally operated. When the navigation device 20 is normally operated in step 603, the program proceeds to step 210, and the value of theft flag SF is made to be "0", and the program proceeds to step 211. However, when the navigation device 20 is not normally operated in step 603, it is judged that the vehicle has been stolen, and the program proceeds to step 209. In step 209, the alarm 17 is driven for 60 seconds, and the value of theft flag SF is made to be "1" at the same time and the program proceeds to step 211.

Even if operation of the navigation device 20 is confirmed in the judgment conducted in step 603, when a position of the vehicle is greatly changed as a result of comparison of the previous vehicle position with the present vehicle position, it is judged that the vehicle has been moved by a crane or other method without leave and with the intention of stealing the vehicle. Therefore, the program may proceed to step 209.

In this connection, in addition to the embodiment described above, the following constitution may be adopted. When the engine key of the vehicle is turned off, the final position of the vehicle, which is detected by the navigation device 20 immediately before the engine key is turned off, is stored in the memory 16 of the security device 10. When the security device 10 detects that the vehicle has been stolen, this final position of the vehicle is read out from the memory 16 and transmitted to the monitoring center via the automobile telephone 30.

It is possible to adopt the following constitution. When the security device 10 detects that the vehicle has been stolen, the vehicle position is detected at intervals of about 10 minutes and transmitted every one hour so that timing of detection is shifted from the timing of transmission.

As explained above, according to the theft prevention device of the present invention, when the theft of a vehicle is detected, the occurrence of the theft and the present position of the vehicle are immediately transmitted to a base station, so that the base station can immediately grasp the occurrence of the theft of the vehicle. Even when a navigation device of the vehicle is out of order, the base station can immediately grasp the problem and the place where the problem is caused.

In this connection, in the embodiment explained above, explanations are made regarding a vehicle theft prevention device. However, the present invention is not limited to the vehicle theft prevention device but the present invention can be applied to a theft prevention device for preventing the theft of a moving body such as a ship or an airplane.

What is claimed is:

1. A theft prevention device comprising:
   a position detecting device detecting a position of a vehicle on the earth;
   a security control unit detecting theft of the vehicle;
   a position storing memory periodically storing a position of the vehicle detected by the position detecting device even when the security control unit does not detect said theft; and
   a transmitting device transmitting the latest positional information stored in the position storing memory when the security control unit detects said theft.

2. A theft prevention device comprising:
   a position detecting device detecting a position of a vehicle on the earth;
   a security control unit detecting theft of the vehicle;
   an abnormal state detecting device for detecting an abnormal state of the position detecting device;
   a position storing memory periodically storing a position of the vehicle detected by the position detecting device even when the security control unit does not detect said theft; and
   a transmitting device transmitting the latest positional information stored in the position storing memory when the abnormal state detecting device detects said abnormal state.

3. A theft prevention device comprising:
   a position detecting device detecting a position of a vehicle on the earth;
   a security control unit detecting theft of the vehicle;
   a position storing memory storing a position of the vehicle detected by the position detecting device;
   a transmitting device transmitting positional information stored in the position storing memory when the security control unit detects theft of the vehicle; and
   wherein the position storing memory is accoimnodated in a casing which is separate from a casing in which the position detecting device is accommodated.

4. A theft prevention device comprising:
   a first position detecting device in which GPS is utilized;
   a position storing memory storing a position of a vehicle detected by the first position detecting device;
   a second position detecting device for detecting a position of the vehicle by using a movement parameter of the vehicle and also using an azimuth parameter based on terrestrial magnetism; and
   a transmitting device transmitting the positional information of the vehicle detected by the second position detecting device when the first position detecting device is out of order.

5. A theft prevention device according to claim 1, wherein the security control unit judges that the vehicle has been stolen when a position of the vehicle is greatly different from the previously detected position of the vehicle in the case of periodically detecting a position of the vehicle by the position detecting device.

6. A theft prevention device comprising:
   a position detecting device periodically detecting a position of a vehicle on the earth;
   a security control unit judges that the vehicle has been stolen when the position detecting device does not operate in the case of periodically detecting a position of the vehicle by the position detecting device;

a position storing memory periodically storing a position of the vehicle detected by the position detecting device; and a transmitting device transmitting the latest positional information stored in the position storing memory when the security control unit judges said theft.

7. A theft prevention device according to claim 1, wherein the position detecting device turns on an electric power source of a circuit necessary for periodically detecting a position of a vehicle and detects the position of the vehicle even in an alert state in the vehicle after the vehicle has stopped or in a state in which the position detecting device does not operate.

8. A theft prevention device according to claim 1, wherein the transmitting device periodically transmits the latest positional information stored in the position storing memory even after the completion of the first transmission.

9. A theft prevention device according to claim 1, wherein the transmitting device transmits a signal to a monitoring center which monitors the vehicle theft and the abnormal state of the position detecting device at all times when a vehicle theft or the abnormal state of the position detecting device is detected.

10. A theft prevention device according to claim 7, wherein a periodical transmitting period of transmitting a position of the vehicle by the transmitting device is different from a position detecting period of detecting the position of the vehicle by the position detecting device.

11. A theft prevention device comprising:

a security control unit detecting theft of a vehicle;

a position storing memory periodically storing a position of the vehicle on the earth read out from a navigation system even when the security control unit does not detect said theft; and a sending device for sending the latest positional information stored in the position storing memory to a transmitting device transmitting to a position out of the vehicle when the security control unit detects said theft.

12. A theft prevention device comprising:

a position detecting means for detecting a position of a vehicle on the earth; a theft detecting means for detecting theft of the vehicle; and a transmitting means, wherein after the theft detecting means detects theft of the vehicle, a position of the vehicle is detected by the position detecting means and transmitted to a predetermined position by the transmitting means, the theft prevention device further comprising a position storing means for periodically storing a position of the vehicle detected by the position detecting means, wherein when the theft detecting means detects theft of the vehicle, the transmitting means transmits the latest positional information stored in the position storing means, wherein at least the position storing means is accommodated in a casing which is separate from a casing in which the position detecting means is accommodated.

13. A theft prevention device comprising:

a position detecting means for detecting a position of a vehicle on the earth; a theft detecting means for detecting theft of the vehicle; and a transmitting means, wherein after the theft detecting means detects theft of the vehicle, a position of the vehicle is detected by the position detecting means and transmitted to a predetermined position by the transmitting means, the theft prevention device further comprising: a position storing means for periodically storing the position of the vehicle detected by the position detecting means; and an abnormal state detecting means for detecting an abnormal state of the position detecting means wherein, when the abnormal state detecting means detects an abnormal state of the position detecting means, the transmitting means transmits the latest positional information stored in the position storing means, wherein at least the position storing means is accommodated in a casing which is separate from a casing in which the position detecting means is accommodated.

14. A theft prevention device comprising:

a position detecting means for detecting a position of a vehicle on the earth; a theft detecting means for detecting theft of the vehicle; and a transmitting means, wherein after the theft detecting means detects theft of the vehicle, a position of the vehicle is detected by the position detecting means and transmitted to a predetermined position by the transmitting means, the theft prevention device further comprising a position storing means for periodically storing a position of the vehicle detected by the position detecting means, wherein when the theft detecting means detects theft of the vehicle, the transmitting means transmits the latest positional information stored in the position storing means, the position detecting means including: a first position detecting means in which GPS is utilized; and a second position detecting means for detecting a position of the vehicle by using a movement parameter of the vehicle and also using an azimuth parameter based on terrestrial magnetism wherein, when the first positional detecting means is out of order, the second positional detecting means detects a position of the vehicle on the basis of the latest positional information stored in the positional storing means, and the transmitting means periodically transmits the position of the vehicle.

15. A theft prevention device comprising:

a position detecting means for detecting a position of a vehicle on the earth; a theft detecting means for detecting theft of the vehicle; and a transmitting means, wherein after the theft detecting means detects theft of the vehicle, a position of the vehicle is detected by the position detecting means and transmitted to a predetermined position by the transmitting means, the theft prevention device further comprising: a position storing means for periodically storing the position of the vehicle detected by the position detecting means; and an abnormal state detecting means for detecting an abnormal state of the position detecting means wherein, when the abnormal state detecting means detects an abnormal state of the position detecting means, the transmitting means transmits the latest positional information stored in the position storing means, the position detecting means including: a first position detecting means in which GPS is utilized; and a second position detecting means for detecting a position of the vehicle by using a movement parameter of the vehicle and also using an azimuth parameter based on terrestrial magnetism wherein, when the first positional detecting means is out of order, the second positional detecting means detects a position of the vehicle on the basis of the latest positional information stored in the positional storing means, and the transmitting means periodically transmits the position of the vehicle.

16. A theft prevention device comprising:

a position detecting means for detecting a position of a vehicle on the earth; a theft detecting means for detecting theft of the vehicle; and a transmitting means, wherein after the theft detecting means detects theft of the vehicle, a position of the vehicle is detected by the position detecting means and transmitted to a predetermined position by the transmitting means, the theft prevention device further comprising a position storing means for periodically storing a position of the vehicle detected by the position detecting means, wherein when the theft detecting means detects theft of the vehicle, the transmitting means transmits the latest positional information stored in the position storing means, wherein the position detecting means turns on an electric power source of a circuit necessary for periodically detecting a position of a vehicle and detects the position of the vehicle even in an alert state of the vehicle after the vehicle has stopped or in a state in which the position detecting means does not operate, wherein the theft detection means judges that the vehicle has been stolen when a position of the vehicle is greatly different from the previously detected position of the vehicle in the case of periodically detecting a position of the vehicle by the position detecting means.

17. A theft prevention device comprising:

a position detecting means for detecting a position of a vehicle on the earth; a theft detecting means for detecting theft of the vehicle; and a transmitting means, wherein after the theft detecting means detects theft of the vehicle, a position of the vehicle is detected by the position detecting means and transmitted to a predetermined position by the transmitting means, the theft prevention device further comprising: a position storing means for periodically storing the position of the vehicle detected by the position detecting means; and an abnormal state detecting means for detecting an abnormal state of the position detecting means wherein, when the abnormal state detecting means detects an abnormal state of the position detecting means, the transmitting means transmits the latest positional information stored in the position storing means, wherein the position detecting means turns on an electric power source of a circuit necessary for periodically detecting a position of a vehicle and detects the position of the vehicle even in an alert state of the vehicle after the vehicle has stopped or in a state in which the position detecting means does not operate, wherein the theft detection means judges that the vehicle has been stolen when a position of the vehicle is greatly different from the previously detected position of the vehicle in the case of periodically detecting a position of the vehicle by the position detecting means.

18. A theft prevention device comprising:

a position detecting means for detecting a position of a vehicle on the earth; a theft detecting means for detecting theft of the vehicle; and a transmitting means, wherein after the theft detecting means detects theft of the vehicle, a position of the vehicle is detected by the position detecting means and transmitted to a predetermined position by the transmitting means, the theft prevention device further comprising a position storing means for periodically storing a position of the vehicle detected by the position detecting means, wherein when the theft detecting means detects theft of the vehicle, the transmitting means transmits the latest positional information stored in the position storing means, wherein the position detecting means turns on an electric power source of a circuit necessary for periodically detecting a position of a vehicle and detects the position of the vehicle even in an alert state of the vehicle after the vehicle has stopped or in a state in which the position detecting means does not operate, wherein the theft detection means judges that the vehicle has been stolen when the position detecting means does not operate in the case of periodically detecting a position of the vehicle by the position detecting means.

19. A theft prevention device comprising:

a position detecting means for detecting a position of a vehicle on the earth; a theft detecting means for detecting theft of the vehicle; and a transmitting means, wherein after the theft detecting means detects theft of the vehicle, a position of the vehicle is detected by the position detecting means and transmitted to a predetermined position by the transmitting means, the theft prevention device further comprising: a position storing means for periodically storing the position of the vehicle detected by the position detecting means; and an abnormal state detecting means for detecting an abnormal state of the position detecting means wherein, when the abnormal state detecting means detects an abnormal state of the position detecting means, the transmitting means transmits the latest positional information stored in the position storing means, wherein the position detecting means turns on an electric power source of a circuit necessary for periodically detecting a position of a vehicle and detects the position of the vehicle even in an alert state of the vehicle after the vehicle has stopped or in a state in which the position detecting means does not operate, wherein the theft detection means judges that the vehicle has been stolen when the position detecting means does not operate in the case of periodically detecting a position of the vehicle by the position detecting means.

* * * * *